United States Patent
Nordstrom et al.

(10) Patent No.: US 12,527,728 B2
(45) Date of Patent: Jan. 20, 2026

(54) BENZOYL PEROXIDE FOAMING CLEANSER

(71) Applicant: L'OREAL, Paris (FR)

(72) Inventors: Jenna Nordstrom, Hoboken, NJ (US); Paula Cziryak, Eatontown, NJ (US); Sabina Gosto, Piscataway, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/976,483

(22) Filed: Oct. 28, 2022

(65) Prior Publication Data

US 2024/0156702 A1    May 16, 2024

(51) Int. Cl.

| | |
|---|---|
| *A61K 8/368* | (2006.01) |
| *A61K 8/49* | (2006.01) |
| *A61K 8/73* | (2006.01) |
| *A61K 8/81* | (2006.01) |
| *A61Q 5/02* | (2006.01) |
| *A61Q 19/10* | (2006.01) |

(52) U.S. Cl.
CPC ............ *A61K 8/368* (2013.01); *A61K 8/4926* (2013.01); *A61K 8/735* (2013.01); *A61K 8/8147* (2013.01); *A61Q 5/02* (2013.01); *A61Q 19/10* (2013.01)

(58) Field of Classification Search
CPC combination set(s) only.
See application file for complete search history.

(56) References Cited

U.S. PATENT DOCUMENTS

| | | | |
|---|---|---|---|
| 5,470,884 A | 11/1995 | Corless et al. | |
| 10,449,175 B2 * | 10/2019 | Buge | A61K 47/02 |
| 10,610,594 B2 * | 4/2020 | Nadau-Fourcade | A61K 47/24 |
| 10,639,246 B2 * | 5/2020 | Schelges | A61K 8/463 |
| 2009/0022818 A1 * | 1/2009 | SenGupta | A61K 8/0279 514/159 |
| 2017/0128407 A1 | 5/2017 | Shalviri et al. | |
| 2019/0388920 A1 * | 12/2019 | Kim | B65D 83/0038 |

FOREIGN PATENT DOCUMENTS

| | | |
|---|---|---|
| EP | 1277463 B1 | 1/2008 |
| EP | 2919745 B1 | 8/2018 |
| EP | 2919747 B1 | 10/2018 |

OTHER PUBLICATIONS

Anonymous, "Acne Foam Cream Cleanser", Jan. 23, 2020, INCI Decoder, https://incidecoder.com/products/cerave-acne-foam-cream-cleanser, retrieved from the web Nov. 22, 2024, 15 pages (Year: 2020).*
Anonymous, Mintel, "Acne Foaming Cleanser", Mar. 2022, Record ID No. 9452970, www.gnpd.com.
Anonymous, Mintel, "Acne Foaming Wash", Dec. 2020, record ID No. 8301881, www.gnpd.com.
Search Report issued to French counterpart Application No. FR 2300011 dated Jul. 11, 2023.

* cited by examiner

*Primary Examiner* — Bethany P Barham
*Assistant Examiner* — Paul Hoerner
(74) *Attorney, Agent, or Firm* — McNees Wallace & Nurick LLC

(57) ABSTRACT

A foaming cleansing composition includes 2.5% to 12.0% Benzoyl Peroxide, at least one acrylate polymer, Hyaluronic Acid, Niacinamide, a combination of anionic and amphoteric surfactants, expressly excluding alkyl polyglucosides, and water. The composition provides a unique textural feel as compared with existing benzoyl peroxide containing products, and in particular, is formulated as a light mousse-type architecture with viscosity which is retained on skin upon application and resists dripping, even in the shower. The composition is shelf stable and stable on application, demonstrating a viscosity of about 18-25 UD (Viscosity Rheomat M3 Spindle), and a pH about 5.5 to about 6.5.

12 Claims, No Drawings

BENZOYL PEROXIDE FOAMING CLEANSER

TECHNICAL FIELD

The disclosure relates to a novel foaming cleansing composition comprising high amounts of benzoyl peroxide which has a unique mousse-type architecture and a pleasing texture on application, that is gentle to the skin, stable, and excludes undesirable surfactants and sulfates.

BACKGROUND

Benzoyl peroxide is proven to be effective to address skin conditions that include mild to moderate acne. Products with high concentrations of benzoyl peroxide offer the greatest opportunity for addressing acne, however, such compositions can prove challenging. Not only are there practical limits on the amount of benzoyl peroxide that can be included in consumer applied compositions, but there are also limits on formulating cleansers that are shelf stable and offer a pleasing comfortable experience for consumers. Typical over the counter benzoyl peroxide based products contain relatively lower amounts of benzoyl peroxide, typically in a range from about 2.5% to about 4%. These compositions have aesthetic properties that are acceptable to consumers though they have limited potency. There are over the counter compositions such as PanOxyl™ 10 which include 10% benzoyl peroxide. These compositions have enhanced potency but are harsh to skin, containing irritating surfactants that are necessary to stabilize the foaming cleansing compositions. And current benzoyl peroxide compositions typically have a thin, lotion type texture with modest foaming. These various compositions provide a limited sensory experience for the consumer, and can be challenging to retain on skin during cleaning due to their runny nature. This can be particularly inconvenient for use in the shower, especially on body parts such as the back and shoulders. Further still, the relative instability of benzoyl peroxide compositions manifests in thinning and diminution of foaming over time at ambient temperatures.

The inventors have overcome these challenges and provide a foaming cleansing composition that has a unique mousse-type architecture that remains stable over time at ambient temperatures and resists freeze/thaw cycles wherein the stability is demonstrated in minimal change in pH and viscosity and visible properties of the foaming cleansing composition.

SUMMARY

According to various embodiments, the disclosure provides a foaming cleansing composition includes 2.5% to 12.0% Benzoyl Peroxide, at least one acrylate polymer, Hyaluronic Acid, Niacinamide, a combination of anionic and amphoteric surfactants, expressly excluding alkyl polyglucosides, and water. The composition provides a unique textural feel as compared with existing benzoyl peroxide containing products, and in particular, is formulated as an opaque gel having a light fluffy mousse-type architecture with viscosity which is retained on skin upon application and resists dripping, even in the shower. The composition is shelf stable and stable on application, demonstrating a viscosity of about 18-25 UD (Viscosity Rheomat M3 Spindle), and a pH about 5.5 to about 6.5.

In some embodiments, Benzoyl Peroxide is present at about 10%, by weight based on the total weight of the foaming cleansing composition.

In some embodiments, the at least one acrylate polymer is present in the foaming cleansing composition from about 0.1% to about 5.0%, by weight based on the total weight of the foaming cleansing composition.

In some embodiments, Hyaluronic Acid is present in the foaming cleansing composition from about 0.1% to about 2.0%, by weight based on the total weight of the foaming cleansing composition.

In some embodiments, Niacinamide is present in the foaming cleansing composition from about 0.1% to about 2.0%, by weight based on the total weight of the foaming cleansing composition.

In some embodiments, the total amount of surfactant in the combination of anionic and amphoteric surfactants is present in the foaming cleansing composition from about 4% to about 15%, by weight based on the total weight of the foaming cleansing composition.

In some embodiments, each surfactant in the combination of anionic and amphoteric surfactants is present in the foaming cleansing composition from about 0.05% to about 15%, by weight based on the total weight of the foaming cleansing composition In some embodiments, the at least one acrylate polymer comprises Acrylates/C10-30 Alkyl Acrylate Crosspolymer.

In some embodiments, the combination of anionic and amphoteric surfactants is selected from the group consisting of sultaines, sulfonates, betaines, amphoacetates, amphopropionates, and combinations thereof.

In some embodiments, the combination of anionic and amphoteric surfactants comprises cocamidopropyl hydroxysultaine, and sodium C14-16 olefin sulfonate.

In some embodiments, the composition excludes alkyl polyglucosides selected from the group consisting of Decyl Glucoside, lauryl glucoside, octyl glucoside, coco glucoside, caprylyl/capryl glucoside, and sodium lauryl glucose carboxylate, and combinations thereof.

In some embodiments, the composition has a pH from about 5.5 to about 6.5.

In some embodiments, the composition has a viscosity of about 18-25 UD.

In some embodiments, the composition comprises at least one additional compound selected from the group consisting of pH adjusters, chelating agents, alcohols, antimicrobials, preservatives, vitamins, fragrances, humectants, emulsifiers, and combinations thereof.

In some embodiments, the foaming cleansing composition is free or essentially free of sulfates, oils, silicones, cationic compounds, and combinations thereof.

In some embodiments, the disclosure provides a foaming cleansing composition, comprising:

About 10.0% Benzoyl Peroxide; at least one acrylate polymer, the acrylate polymer comprising acrylates/C10-30 alkyl acrylate crosspolymer present from about 0.1% to about 5.0%; from about 0.1% to about 2.0% Hyaluronic Acid; from about 0.1% to about 2.0% Niacinamide; from about 4.0% to about 15.0% a combination of anionic and amphoteric surfactants, expressly excluding alkyl polyglucosides; Water; and at least one additional compound selected from the group consisting of pH adjusters, chelating agents, alcohols, antimicrobials, preservatives, vitamins, fragrances, humectants, emulsifiers, and combinations thereof, all amounts by weight, based on the weight of the composition, wherein the composition has a mousse-type architecture, a pH from about 5.5 to about 6.5, and a viscosity of about 18-25 UD.

In some embodiments, the foaming cleansing composition is free or essentially free of sulfates, oils, silicones, cationic compounds, and combinations thereof.

In some embodiments, the disclosure provides a method for cleansing and enhancing acne-prone skin, comprising: providing a foaming cleansing composition according to claim 1, wherein the composition is contained and dispensed as a mousse; initially rubbing the composition onto skin whereupon foaming is accomplished while being retained on skin; rinsing to remove the composition.

DESCRIPTION

It is known in the art that inclusion of benzoyl peroxide is associated with thinning over time such that benzoyl peroxide products tend to become runny over a typical shelf life. For this reason, it is challenging to formulate products which contain amounts of benzoyl peroxide active that provide desirable results in a form that is pleasing. The inventors have provided a 10% benzoyl peroxide composition that overcomes these challenges. The inventive composition provides a unique textural feel as compared with existing benzoyl peroxide containing products, and in particular, is formulated as a light fluffy mousse-type architecture with viscosity which is retained on skin upon application and resists dripping, even in the shower.

Comparatives include alkyl polyglycoside surfactants which can be associated with allergenic properties and which are believed to be affected by increased amounts of benzoyl peroxide lending to adverse effects on viscosity. Accordingly, high benzoyl peroxide containing cleansers (2-10% benzoyl peroxide) are known to be runny and stringy with low viscosity.

Inventive eliminates alkyl polyglucoside surfactants and replaces thickeners like xanthan gum with acrylate polymer thickeners that demonstrate salt and low pH tolerance and tolerance to high levels of surfactants. Formulated to be free of alkyl polyglucoside surfactants, sulfates, parabens, and other consumer disfavored ingredients, the foaming cleansing composition exemplified herein contains 10% benzoyl peroxide, acrylate polymer, hyaluronic acid and niacinamide, and a combination of anionic and amphoteric surfactants and emulsifiers in a pleasing and foamy mousse that is shelf stable and stable on application, demonstrating a viscosity of about 18-25 UD (Viscosity Rheomat M3 Spindle), and a pH about 5.5 to about 6.5. The inventive foaming cleansing composition delivers a high amount of benzoyl peroxide active for maximizing skin benefit in an enjoyable skin experience for the consumer.

As exemplified herein, the inventors have prepared formulations in which key ingredients have been serially substituted, in particular, thickener (acrylate polymer), replacement of surfactants with alkyl polyglucoside surfactants, and removal of hyaluronic acid and/or niacinamide, demonstrating the contribution of the components to a composition that has the sensorial, viscosity and shelf stability that is accomplished in the inventive composition. Thus, while hyaluronic acid offers the benefits or retention of skin's natural moisture and niacinamide provides soothing skin healing benefits, these components also unexpectedly prove important to providing a mousse-type architecture that also delivers effective and pleasing foaming upon application to enhance the cleansing experience.

As used herein, the term "keratinous substrate" is intended to include skin and hair.

As used herein, the term "stability," with respect to a cleansing composition, refers to the cleansing composition remaining in a mixed stable-viscosity state with generally homogenous bubble and benzoyl peroxide dispersion wherein the foaming cleansing composition does not exhibit appreciable thinning or separating, such as not phase separating, and retention of mousse-type architecture foam structure. Such properties are achieved with the inclusion of high amounts of benzoyl peroxide (from about 2.5%, and over about 4% and up to about 12%), which typically is associated with significant thinning and loose bubble structure in prior art compositions.

As used herein, the terms "mousse" and "mousse-type architecture" and "mousse form" and "mousse texture" refer to an architecture (or form) of a foam when applied, containing suspended and dispersed bubbles.

"Stability" is evidenced by one or both of direct measurement of viscosity and visual inspection. For purposes hereof, a composition that demonstrates physical stability and does not thin, lose mousse structure, and matins dispersion of benzoyl peroxide, is stable. In various embodiments, an inventive composition remains stable at temperatures in the range from about 4° C. to about 35° C., over a time period of at least one month, or at least two months, or at least three months, or longer, or any value, range, or sub-range therebetween. In some embodiments, a cleansing composition is stable at 25° C. for at least one month, or at least two months, or at least three months, or longer, or any value, range, or sub-range therebetween. In some embodiments, a cleansing composition is stable at 37° C. for at least one month, or at least two months, or at least three months, or longer, or any value, range, or sub-range therebetween. As disclosed and exemplified herein, a cleansing composition is stable at 4° C. for at least one month, or at least two months, or at least three months, or longer, or any value, range, or sub-range therebetween.

The terms "essentially free of alkyl polyglycoside surfactants," "essentially free alkyl polyglycoside surfactants," "essentially free of alkyl polyglycoside surfactants," and "essentially alkyl polyglycoside surfactants-free" refer to the essential absence of alkyl polyglycoside surfactants contents in the cleansing composition of the present invention.

The terms "essentially free of sulfate," "essentially free of sulfate-based surfactant," "essentially free of sulfate-based surfactant," and "essentially sulfate-free" refer to the essential absence of sulfate contents in the foaming cleansing composition of the present invention. In reference to some embodiments, the term "sulfate-free" means that sulfate has not been added as a component. In reference to some embodiments, the foaming cleansing composition is devoid of sulfates. In reference to some embodiments, the foaming cleansing composition is free or devoid of sulfates that may include, but are not limited to, anionic alkyl sulfates and alkyl ether sulfates. In reference to some embodiments, while it is preferred that no sulfate-based surfactants are present in the foaming cleansing composition, it is possible to have very small amounts of sulfate-based surfactants in the foaming cleansing composition of the invention, provided that these amounts do not materially affect the advantageous properties of the foaming cleansing composition, in particular with respect to mildness to skin. Thus, a sulfate-based surfactant can be present in the foaming cleansing composition at an amount of less than about 0.2% by weight, or less than about 0.1% by weight, or less than about 0.05% by weight, or about 0% by weight, based on the total weight of the foaming cleansing composition. In some embodiments, the foaming cleansing composition is free of cationic compounds; sulfate-based surfactants, or any combination thereof. In some embodiments, the foaming cleansing composition is free of sulfate containing compounds, in particular, but not limited to sodium lauryl sulfate, Sodium Lauryl Sulfate, Sodium laureth sulfate, sodium lauryl ether sulfate, Ammonium lauryl sulfate, Ammonium Laureth Sulfate, or any combinations of these.

Benzoyl Peroxide

In accordance with the disclosure, various non-limiting embodiments of the foaming cleansing composition include benzoyl peroxide present from at least about 2.5% to about 12%. In some particular embodiments, as exemplified herein, the foaming cleansing composition comprises benzoyl peroxide from about 9% to about 12%, or from about 10% to about 11%, or about 10%, by weight of the foaming cleansing composition.

Thickening and Surfactant System

In accordance with the disclosure, various non-limiting embodiments of the foaming cleansing composition that includes from about 2.5% to about 12% benzoyl peroxide, is provided in a thickening and surfactant system that includes at least one acrylate polymer, hyaluronic acid and niacinamide, and a combination of anionic and amphoteric surfactants and emulsifiers in water.

In accordance with the various embodiments of the foaming cleansing composition, the thickening and surfactant system includes a thicker comprising an acrylates polymer as described herein, with or without a carbomer and xanthan or a combination thereof. The thickening and surfactant system also includes a combination of anionic and amphoteric surfactants and one or more emulsifiers.

In an exemplified embodiment, the foaming cleansing composition includes an acrylates polymer comprising an acrylates/C10-30 alkyl acrylate crosspolymer, with or without carbomer and xanthan, surfactants that include diethylhexyl sodium sulfosuccinate, cocamidopropyl hydroxysultaine, and sodium C14-16 olefin sulfonate, emulsifiers that include sodium lauroyl lactylate and PEG-30 dipolyhydroxystearate, trideceth-6, and water.

The foaming cleansing composition also includes from about 0.1% to about 2.0% Hyaluronic Acid and from about 0.1% to about 2.0% Niacinamide. In the various embodiments, each of hyaluronic acid and niacinamide is present in the foaming cleansing composition, by weight, in an amount from about 0.1%, and up to about 2%, or from about 0.1% to about 1%, or any value, range, or sub-range therebetween. One of ordinary skill in the art, however, will appreciate that other ranges are within the scope of the invention.

Thus, each of hyaluronic acid and niacinamide is present by weight, based on the total weight of the foaming cleansing composition, from about, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 to about 2 percent, including increments and ranges therein and there between.

Polymeric Thickener

In various embodiments, a cleansing composition includes at least one high-electrolyte polymeric thickener with high stability. The polymeric thickener is an acrylates crosslinking copolymer or crosspolymer including hydrophilic units and hydrophobic units. In exemplary embodiments, the polymeric thickener is an acrylates/C10-30 alkyl acrylate crosspolymer.

Polymer Thickeners have a high electrolyte property and exhibit a high salt tolerance such that it can thicken in a medium that has high or low amounts of salts, is acidic or basic and includes a wide variety of ingredients. High electrolyte polymers include polymeric repeating units that bear an electrolyte group that may include polycations and polyanions. These groups dissociate in aqueous solutions (water), making the polymers charged. Many biological molecules are polyelectrolytes, such as polypeptides, glycosaminoglycans, and DNA.

Accordingly, in at least some embodiments, the foaming cleansing composition according to the disclosure includes acrylates/C10-30 alkyl acrylate crosspolymer, in particular the high-electrolyte forms supplied that include Tego Carbomer 841 Ser or AQUPEC SERK 300C, or Carbopol Ultrez 20 Polymer, and combinations thereof.

In at least some embodiments, the foaming cleansing composition according to the disclosure excludes one or more polymeric thickeners that are not high-electrolyte thickeners. And more particularly according to such embodiments, the foaming cleansing composition excludes Polyacrylate Crosspolymer-6, acrylates/steareth-20 methacrylate copolymer, PEG 120 methyl glucose trioleate (and) propanediol, acrylates/beheneth 25 methacrylate copolymer, xanthan gum, carbomer, hydroxyethyl cellulose, hydroxypropyl methylcellulose, and acrylates/C10-30 alkyl acrylate crosspolymer that do not have high-electrolyte content.

In the various embodiments, the polymeric thickener is present in the foaming cleansing composition, by weight, in an amount in the range of at least 0.1%, or up to about 10%, or up to about 3%, or about 0.9%, or from about 0.1% to about 10%, or from about 0.1% to about 5%, or from about 0.8% to about 2%, or from about 0.1% to about 3%, or any value, range, or sub-range therebetween. One of ordinary skill in the art, however, will appreciate that other ranges are within the scope of the invention.

In some particular embodiments, the foaming cleansing composition comprises acrylates/C10-30 alkyl acrylate crosspolymer, alone or with xanthan gum and carbomer. In some particular embodiments, the foaming cleansing composition comprises acrylates/C10-30 alkyl acrylate crosspolymer, alone or with xanthan gum and carbomer and excludes Polyacrylate Crosspolymer-6.

Thus, one or more polymeric thickener is present by weight, based on the total weight of the foaming cleansing composition, from about, 0.1, 0.2, 0.3, 0.4, 0.5, 0.6, 0.7, 0.8, 0.9, 1, 2, 3, 4, 5, 6, 7, 8, 9 to about 10 percent, including increments and ranges therein and there between.

Surfactants

In various embodiments, the foaming cleansing composition according to the disclosure includes a combination of anionic and amphoteric surfactants, expressly excluding alkyl polyglucosides. In some embodiments, the total amount of surfactant in the combination of anionic and amphoteric surfactants is present in the foaming cleansing composition from about 4% to about 15%, by weight based on the total weight of the foaming cleansing composition.

In some embodiments, each surfactant in the combination of anionic and amphoteric surfactants is present in the foaming cleansing composition from about 0.05% to about 15%, by weight based on the total weight of the foaming cleansing composition In some embodiments, the combination of anionic and amphoteric surfactants is selected from the group consisting of sultaines, sulfonates, betaines, amphoacetates, amphopropionates, and combinations thereof.

In some embodiments, the combination of anionic and amphoteric surfactants comprises cocamidopropyl hydroxysultaine, and sodium C14-16 olefin sulfonate.

In some embodiments, the composition excludes alkyl polyglucosides selected from the group consisting of Decyl Glucoside, lauryl glucoside, octyl glucoside, coco glucoside, caprylyl/capryl glucoside, and sodium lauryl glucose carboxylate, and combinations thereof.

Anionic Surfactant

The foaming cleansing composition comprises at least one anionic surfactant. As used herein, the term "anionic surfactant" means a surfactant comprising, as ionic or ionizable groups, only anionic groups. These anionic groups are preferably chosen from the groups $CO_2H$, $CO_2$, $SO_3H$, $SO_3^-$, $OSO_3H$, $OSO_3^-O_2PO_2H$, $O_2PO_2H$, and $O_2PO_2^{2-}$.

According to various embodiments, the at least one anionic surfactant may be chosen from acyl isethionates of the following formulae (I) or (II):

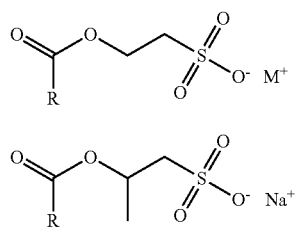

wherein R is chosen from H or an alkyl chain having from 1 to 30 carbon atoms, such as 6 to 24 carbon atoms, for example 8 to 20 carbon atoms, said chain being saturated or unsaturated, linear or branched, and $M^+$ is a cation. Although sodium is shown as the cation in formula (II), it should be understood that the cation for both formula (I) and formula (II) may be any alkali metal ion such as sodium or potassium, ammonium ions, or alkanolammonium ions such as monoethanolammonium or triethanolammonium ions.

By way of non-limiting example, suitable acyl isethionate surfactants may include the reaction product of fatty acids esterified with isethionic acid and neutralized with sodium hydroxide. For example, acyl isethionates surfactants may be prepared by the reaction of an isethionate salt such as metal or ammonium isethionate and an a saturated or unsaturated, straight or branched, alkyl or alkenyl chain fatty acid having from 6 to 30 carbon atoms, preferably from 8 to 22 carbon atoms, more preferably from 6 to 18 carbon atoms. Optionally, a mixture of aliphatic fatty acids may be used for the preparation of commercial fatty acyl isethionates surfactants. Suitable fatty acids for isethionate surfactants can be derived from coconut oil or palm kernel oil, for instance.

Non-limiting examples of acyl isethionate surfactants that may be used include sodium lauroyl isethionate, sodium lauroyl methyl isethionate, sodium oleoyl isethionate, sodium oleoyl methyl isethionate, sodium stearoyl isethionate, sodium stearoyl methyl isethionate, sodium myristoyl isethionate, sodium myristoyl methyl isethionate, sodium palmitoyl isethionate, sodium palmitoyl methyl isethionate, sodium cocoyl isethionate, sodium cocoyl methyl isethionate, a blend of stearic acid and sodium cocoyl isethionate, ammonium cocoyl isethionate, ammonium cocoyl methyl isethionate, and combinations thereof.

When present, the at least one second anionic surfactant may be chosen from either non-sulfate or sulfate-based anionic surfactants.

In some embodiments, the foaming cleansing composition is free or essentially free of sulfate-based surfactants, for example, alkyl sulfates, alkyl ether sulfates, alkylamido ether sulfates, alkylaryl polyether sulfates, monoglyceride sulfates, or combinations thereof. Examples include ($C_6$-$C_{24}$)alkyl sulfates, ($C_6$-$C_{24}$)alkyl ether sulfates, which may be ethoxylated, comprising from 2 to 50 ethylene oxide units, and combinations thereof, in particular in the form of alkali metal salts or alkaline-earth metal salts, ammonium salts or amino alcohol salts; ($C_{10}$-$C_{20}$)alkyl ether sulfates, and in particular sodium lauryl ether sulfate, for example containing 2.2 mol of ethylene oxide; sodium lauryl sulfate, sodium lauryl ether sulfate, ammonium lauryl sulfate, ammonium lauryl ether sulfate, sodium laureth sulfate, or combinations thereof may be chosen.

The anionic surfactant may be chosen from non-sulfate anionic surfactants, such as, for example, alkylsulfonates, alkylamide sulfonates, alkylarylsulfonates, alpha-olefin sulfonates, paraffin sulfonates, alkylsulfosuccinates, alkyl ether sulfosuccinates, alkylamide sulfosuccinates, alkyl sulfoacetates, acylsarcosinates, acylglutamates, alkylsulfosuccinamates, acylisethionates and N-acyltaurates, salts of alkyl monoesters and polyglycoside-polycarboxylic acids, acyllactylates, salts of D-galactoside uronic acids, salts of alkyl ether carboxylic acids, salts of alkyl aryl ether carboxylic acids, and salts of alkylamido ether carboxylic acids; or the non-salified forms of all of these compounds, the alkyl and acyl groups of all of these compounds containing from 6 to 24 carbon atoms and the aryl group denoting a phenyl group. Some of these compounds may be oxyethylenated and then preferably comprise from 1 to 50 ethylene oxide units.

Useful alkyl sulfonates include those of formula (VI):

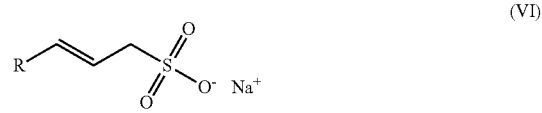

wherein R is selected from H or alkyl chain that has from 1 to 30 carbon atoms, such as from 6 to 24 carbon atoms, for example from 8 to 20 carbon atoms, said chain being saturated or unsaturated, linear or branched. It should be noted that although sodium is shown as the cation in the above formula (VI), the cation may be any alkali metal ion such as sodium or potassium, ammonium ions, or alkanolammonium ions such as monoethanolammonium or triethanolammonium ions. In some instances, the alkyl sulfonate(s) are selected from C8-C16 alkyl benzene sulfonates, C10-C20 paraffin sulfonates, C10-C24 olefin sulfonates, salts thereof, and combinations thereof.

By way of non-limiting example, alkyl sulfonates may be chosen from alkyl aryl sulfonates, primary alkane disulfonates, alkene sulfonates, hydroxyalkane sulfonates, alkyl glyceryl ether sulfonates, alpha-olefinsulfonates, sulfonates of alkylphenolpolyglycol ethers, alkylbenzenesulfonates, phenvlalkanesulfonates, alpha-olefinsulfonates, olefin sulfonates, alkene sulfonates, hydroxyalkanesulfonates and disulfonates, secondary alkanesulfonates, paraffin sulfonates, ester sulfonates, sulfonated fatty acid glycerol esters, and alpha-sulfo fatty acid methyl esters including methyl ester sulfonate.

Non-limiting examples of useful alkyl sulfosuccinates include those of formula (VII):

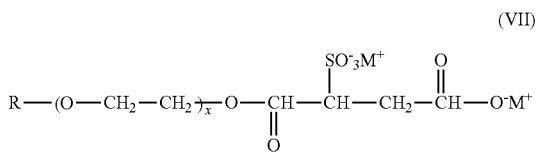

(VII)

wherein R is a straight or branched chain alkyl or alkenyl group having from 10 to 22 carbon atoms, such as 10 to 20 carbon atoms, and $M^+$ is a cation which can independently of each other be, for example, any alkali metal ion such as sodium, potassium, or ammonium, or alkanolammonium ions such as monoethanolammonium or triethanolammonium ions.

Non-limiting examples of alkyl sulfosuccinates salts include diethylhexyl sodium sulfosuccinate, disodium oleamido MIPA sulfosuccinate, disodium oleamido MEA sulfosuccinate, disodium lauryl sulfosuccinate, disodium laureth sulfosuccinate, diammonium lauryl sulfosuccinate, diammonium laureth sulfosuccinate, dioctyl sodium sulfosuccinate, disodium oleamide MEA sulfosuccinate, sodium dialkyl sulfosuccinate, and a mixture thereof.

Exemplary and non-limiting alkyl sulfoacetates include C4-C18 fatty alcohol sulfoacetates and/or salts thereof, such as sodium lauryl sulfoacetate. Useful cations for the salts include any alkali metal ion such as sodium or potassium, ammonium ions, or alkanolammonium ions such as monoethanolammonium or triethanolammonium ions.

Non-limiting examples of alkoxylated monoacids include compounds corresponding to formula (VIII): R—O[CH$_2$O]$_u$[(CH$_2$)$_x$CH(R')(CH$_2$)$_y$(CH2)$_z$O]$_v$[CH$_2$CH$_2$O]$_w$CH$_2$—COOH (VIII)

wherein:
R is a hydrocarbon radical containing from about 6 to about 40 carbon atoms;
u, v, and w, independently of one another, represent numbers of from 0 to 60;
x, y, and z, independently of one another, represent numbers of from 0 to 13;
R' represents hydrogen or alkyl; and
the sum of x+y+z>0.

Compounds corresponding to formula (VIII) may be obtained by alkoxylation of alcohols R—OH with ethylene oxide as the sole alkoxide, or with several alkoxides and subsequent oxidation. The numbers u, v, and w each represent the degree of alkoxylation. Whereas, on a molecular level, the numbers u, v, and w and the total degree of alkoxylation can only be integers, including zero, on a macroscopic level they are mean values in the form of broken numbers.

In formula (VIII), R is linear or branched, acyclic or cyclic, saturated or unsaturated, aliphatic or aromatic, substituted or unsubstituted. R may be a linear or branched, acyclic C6-40 alkyl or alkenyl group, or a C1-40 alkyl phenyl group, for example a C8-22 alkyl or alkenyl group or a C4-18 alkyl phenyl group, such as a C12-18 alkyl group or alkenyl group or a C6-16 alkyl phenyl group; u, v, w, independently of one another, may be a number from 2 to 20, for example a number from 3 to 17, such as a number from 5 to 15; x, y, z, independently of one another, may be a number from 2 to 13, for example a number from 1 to 10, such as a number from 0 to 8.

By way of example only, useful alkoxylated monoacids include Butoxynol-5 Carboxylic Acid, Butoxynol-19 Carboxylic Acid, Capryleth-4 Carboxylic Acid, Capryleth-6 Carboxylic Acid, Capryleth-9 Carboxylic Acid, Ceteareth-25 Carboxylic Acid, Coceth-7 Carboxylic Acid, C9-11 Pareth-6 Carboxylic Acid, C11-15 Pareth-7 Carboxylic Acid, C12-13 Pareth-5 Carboxylic Acid, C12-13 Pareth-8 Carboxylic Acid, C12-13 Pareth-12 Carboxylic Acid, C12-15 Pareth-7 Carboxylic Acid, C12-15 Pareth-8 Carboxylic Acid, C14-15 Pareth-8 Carboxylic Acid, Deceth-7 Carboxylic Acid, Laureth-3 Carboxylic Acid, Laureth-4 Carboxylic Acid, Laureth-5 Carboxylic Acid, Laureth-6 Carboxylic Acid, Laureth-8 Carboxylic Acid, Laureth-10 Carboxylic Acid, Laureth-11 Carboxylic Acid, Laureth-12 Carboxylic Acid, Laureth-13 Carboxylic Acid, Laureth-14 Carboxylic Acid, Laureth-17 Carboxylic Acid, PPG-6-Laureth-6 Carboxylic Acid, PPG-8-Steareth-7 Carboxylic Acid, Myreth-3 Carboxylic Acid, Myreth-5 Carboxylic Acid, Nonoxynol-5 Carboxylic Acid, Nonoxynol-8 Carboxylic Acid, Nonoxynol-10 Carboxylic Acid, Octeth-3 Carboxylic Acid, Octoxynol-20 Carboxylic Acid, Oleth-3 Carboxylic Acid, Oleth-6 Carboxylic Acid, Oleth-10 Carboxylic Acid, PPG-3-Deceth-2 Carboxylic Acid, Capryleth-2 Carboxylic Acid, Ceteth-13 Carboxylic Acid, Deceth-2 Carboxylic Acid, Hexeth-4 Carboxylic Acid, Isosteareth-6 Carboxylic Acid, Isosteareth-11 Carboxylic Acid, Trudeceth-3 Carboxylic Acid, Trideceth-6 Carboxylic Acid, Trideceth-8 Carboxylic Acid, Trideceth-12 Carboxylic Acid, Trideceth-3 Carboxylic Acid, Trideceth-4 Carboxylic Acid, Trideceth-7 Carboxylic Acid, Trideceth-15 Carboxylic Acid, Trideceth-19 Carboxylic Acid, Undeceth-5 Carboxylic Acid and combinations thereof. In some cases, preferred ethoxylated acids include Oleth-10 Carboxylic Acid, Laureth-5 Carboxylic Acid, Laureth-11 Carboxylic Acid, and combinations thereof.

Acyl amino acids include, but are not limited to, amino acid surfactants based on alanine, arginine, aspartic acid, glutamic acid, glycine, isoleucine, leucine, lysine, phenylalanine, serine, tyrosine, valine, sarcosine, threonine, and taurine. The most common cation associated with the acyl amino acid can be sodium or potassium. Alternatively, the cation can be an organic salt such as triethanolamine (TEA) or a metal salt. Non-limiting examples of useful acyl amino acids include those of formula (IX):

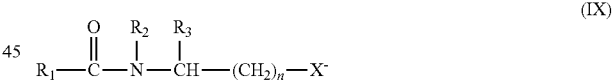

(IX)

wherein R, R1, R2, and R3 are each independently selected from H or an alkyl chain having from 1 to 30 carbon atoms, said chain being saturated or unsaturated, linear or branched, and X is COO$^-$ or SO$_3^-$.

By way of example, useful acyl amino acids include acyl taurates, acyl glycinates, acyl glutamates, acyl sarcosinates, salts thereof, and combinations thereof.

Exemplary useful acyl taurates include those of formula (X):

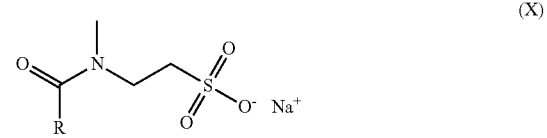

(X)

wherein R is selected from H or an alkyl chain having from 1 to 30 carbon atoms, such as from 6 to 24 carbon atoms, for example from 8 to 20 carbon atoms, said chain being saturated or unsaturated, linear or branched. It should be noted that although sodium is shown as the cation in the above formula (X), the cation may be any alkali metal ion such as sodium or potassium, ammonium ions, or alkanolammonium ions such as monoethanolammonium or triethanolammonium ions. Non-limiting examples of acyl taurate salts include sodium cocoyl taurate, sodium methyl cocoyl taurate, and combinations thereof.

Exemplary useful acyl glycinates include those of formula (XI):

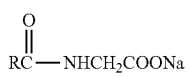
(XI)

wherein R is an alkyl chain of 8 to 16 carbon atoms. It should be noted that although sodium is shown as the cation in the above formula (XI), the cation may be any alkali metal ion such as sodium, potassium, or ammonium ions, or alkanolammonium ions such as monoethanolammonium or triethanolammonium ions. Non-limiting examples of acyl glycinates include sodium cocoyl glycinate, sodium lauroyl glycinate, sodium myristoyl glycinate, potassium lauroyl glycinate, and potassium cocoyl glycinate, and combinations thereof.

Exemplary useful acyl glutamates include those of formula (XII):

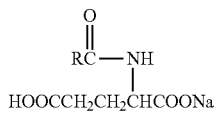
(XII)

wherein R is an alkyl chain of 8 to 16 carbon atoms. It should be noted that although sodium is shown as the cation in the above formula (XII), the cation may be any alkali metal ion such as sodium, potassium, or ammonium ions, or alkanolammonium ions such as monoethanolammonium or triethanolammonium ions. Non-limiting examples of acyl glutamates include dipotassium capryloyl glutamate, dipotassium undecylenoyl glutamate, disodium capryloyl glutamate, disodium cocoyl glutamate, disodium lauroyl glutamate, disodium stearoyl glutamate, disodium undecylenoyl glutamate, potassium capryloyl glutamate, potassium cocoyl glutamate, potassium lauroyl glutamate, potassium myristoyl glutamate, potassium stearoyl glutamate, potassium undecylenoyl glutamate, sodium capryloyl glutamate, sodium cocoyl glutamate, sodium lauroyl glutamate, sodium myristoyl glutamate, sodium olivoyl glutamate, sodium palmitoyl glutamate, sodium stearoyl glutamate, sodium undecylenoyl glutamate, triethanolamine mono-cocoyl glutamate, triethanolamine lauroylglutamate, disodium cocoyl glutamate, and combinations thereof.

Non-limiting examples of acyl sarcosinates include potassium lauroyl sarcosinate, potassium cocoyl sarcosinate, sodium cocoyl sarcosinate, sodium lauroyl sarcosinate, sodium myristoyl sarcosinate, sodium oleoyl sarcosinate, sodium palmitoyl sarcosinate, ammonium lauroyl sarcosinate, and combinations thereof.

When the anionic surfactant(s) are in salt form, they may be chosen especially from alkali metal salts such as the sodium or potassium salt and preferably the sodium salt, ammonium salts, amine salts and in particular amino alcohol salts, or alkaline-earth metal salts such as the magnesium salt. Examples of amino alcohol salts that may especially be mentioned include monoethanolamine, diethanolamine and triethanolamine salts, monoisopropanolamine, diisopropanolamine or triisopropanol-amine salts, 2-amino-2-methyl-1-propanol salts, 2-amino-2-methyl-1,3-propanediol salts and tris(hydroxymethyl)aminomethane salts. Alkali metal or alkaline-earth metal salts and in particular the sodium or magnesium salts may be used. Exemplary salts of $C_6$-$C_{24}$ alkyl monoesters of polyglycoside-polycarboxylic acids include $C_6$-$C_{24}$ alkyl polyglycoside-citrates, $C_6$-$C_{24}$ alkyl polyglycoside-tartrates and $C_6$-$C_{24}$ alkyl polyglycoside-sulfo succinates.

The anionic surfactant system may be present in the foaming cleansing composition in an amount ranging from about 0.05% to about 15%, or from about 0.05% to about 10%, or about 1% to about 2%, by weight, based on the total weight of the foaming cleansing composition. For example, the anionic surfactant system may be present in an amount ranging from about 0.05% to about 14%, about 0.05% to about 15%, about 5% to about 13%, about 5% to about 12%, about 5% to about 11%, about 5% to about 10%, about 6% to about 15%, about 6% to about 14%, about 6% to about 13%, about 6% to about 12%, about 6% to about 11%, about 6% to about 10%, about 7% to about 15%, about 7% to about 14%, about 7% to about 13%, about 7% to about 12%, about 7% to about 11%, about 7% to about 10%, about 8% to about 15%, about 8% to about 14%, about 8% to about 13%, about 8% to about 12%, about 8% to about 11%, about 8% to about 10%, about 9% to about 15%, about 9% to about 14%, about 9% to about 13%, about 9% to about 12%, about 9% to about 11%, about 9% to about 10%, about 10% to about 15%, about 10% to about 14%, about 10% to about 13%, about 10% to about 12%, about 10% to about 11%, or about 10% to about 10%, including ranges and sub-ranges there between, by weight, based on the weight of the total composition.

Thus, any one anionic surfactant, when present, is present, by weight, based on the total weight of the foaming cleansing composition, from about 0.05, 0.06, 0.07, 0.08, 0.09, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 6, 7, 8, 9, 10, 11, 12, 13, 14, to about 15 weight percent, including increments and ranges therein and there between.

Amphoteric Surfactant

Non-limiting examples of amphoteric surfactants include betaines, sultaines, amphoacetates, amphoproprionates, and combinations thereof. In certain embodiments, betaines and amphoproprionates are used. In certain embodiments, betaines are used. Betaines which can be used in the current foaming cleansing composition include those having the following formulae (XIV)-(XVII):

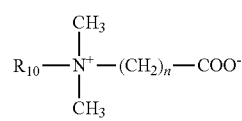
(XIV)

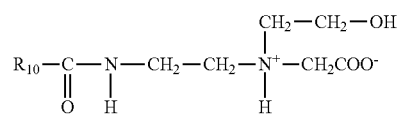
(XV)

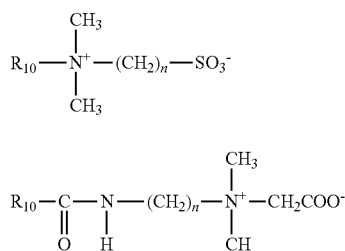
(XVI)

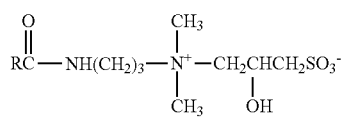
(XVII)

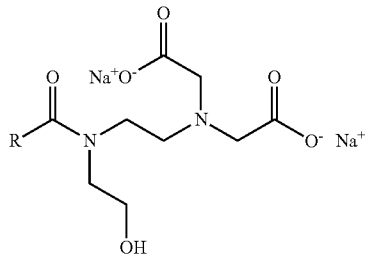
(XX)

wherein in formulae (XIV)-(XVII):

R10 is an alkyl group having from 8 to 18 carbon atoms; and n is an integer from 1 to 3.

Non-limiting examples of amphoteric surfactants also include cocamidopropyl hydroxysultaine, coco betaine, cocoamidopropyl betaine, lauryl betaine, laurylhydroxy sulfobetaine, lauryldimethyl betaine, cocoamidopropyl hydroxysultaine, behenyl betaine, capryl/capramidopropyl betaine, lauryl hydroxysultaine, stearyl betaine, and combinations thereof. In certain embodiments, the at least one betaine compound may be chosen from the group consisting of coco betaine, cocoamidopropyl betaine, behenyl betaine, capryl/capramidopropyl betaine, lauryl betaine, and combinations thereof.

Hydroxyl sultaines useful in the foaming cleansing composition according to embodiments of the disclosure include the following formula (XVIII):

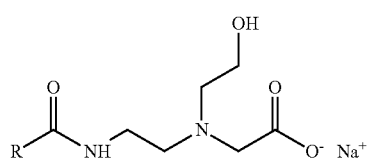
(XVIII)

wherein R is an alkyl group having from 8 to 18 carbon atoms.

Useful alkylamphoacetates include those having the formula (XIX):

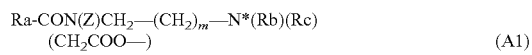
(XIX)

wherein R is an alkyl group having from 8 to 18 carbon atoms.

Useful alkyl amphodiacetates include those having the formula (XX):

wherein R is an alkyl group having from 8 to 18 carbon atoms.

The amphoteric surfactants of the present disclosure may be optionally quaternized secondary or tertiary aliphatic amine derivatives, in which the aliphatic group is a linear or branched chain comprising from 8 to 22 carbon atoms, said amine derivatives containing at least one anionic group, for instance a carboxylate, sulfonate, sulfate, phosphate or phosphonate group.

Mention may be made in particular of ($C_8$-$C_{20}$)alkylbetaines, ($C_8$-$C_{20}$)alkylamido ($C_1$-$C_6$)alkylbetaines, sulfobetaines, ($C_8$-$C_{20}$)alkylsulfobetaines, ($C_8$-$C_{20}$)alkylamido ($C_1$-$C_6$)alkylsulfobetaines, ($C_8$-$C_{20}$)alkylamphoacetate, ($C_8$-$C_{20}$)alkylamphodiacetate, and combinations thereof.

Among the optionally quaternized secondary or tertiary aliphatic amine derivatives that may be used, mention may also be made of the products of respective structures (A1) and (A2) below:

$$Ra\text{-}CON(Z)CH_2\text{---}(CH_2)_m\text{---}N^*(Rb)(Rc) \quad (CH_2COO\text{---}) \quad (A1)$$

wherein:

Ra represents a $C_{10}$-$C_{30}$ alkyl or alkenyl group derived from an acid Ra-COOH preferably present in hydrolysed coconut oil, a heptyl group, a nonyl group or an undecyl group, Rb represents a β-hydroxyethyl group, Rc represents a carboxymethyl group;

m is equal to 0, 1 or 2, and

Z represents a hydrogen atom or a hydroxyethyl or carboxymethyl group;

$$Ra'\text{-}CON(Z)CH_2\text{---}(CH_2)_m\text{---}N(B)(B') \quad (A2)$$

wherein:

B represents —$CH_2CH_2OX'$, with X' representing —$CH_2$—COOH, $CH_2$—COOZ', $CH_2CH_2$—COOH, —$CH_2CH_2$—COOZ', or a hydrogen atom, B' represents —$(CH_2)_z$—Y', with z=1 or 2, and Y' representing COOH, COOZ', $CH_2$—CHOH—$SO_3H$ or —$CH_2$—CHOH—$SO_3Z'$, m' is equal to 0, 1 or 2, Z represents a hydrogen atom or a hydroxyethyl or carboxymethyl group, Z' represents an ion resulting from an alkali or alkaline-earth metal, such as sodium, potassium or magnesium; an ammonium ion; or an ion resulting from an organic amine and in particular from an amino alcohol, such as monoethanolamine, diethanolamine and triethanolamine, monoisopropanol-amine, diisopropanolamine or triisopropanolamine, 2-amino-2-methyl-1-propanol, 2-amino-2-methyl-1,3-propanediol and tris (hydroxymethyl)aminomethane, and Ra' represents a $C_{10}$-$C_{30}$ alkyl or alkenyl group of an acid Ra'COOH preferably pre-sent in hydrolysed linseed oil or coconut oil, an alkyl group, in particular a $C_{17}$ alkyl group, and its iso form, or an unsaturated $C_{17}$ group.

Exemplary amphoteric surfactants include sodium cocoamphoacetate, sodium lauroamphoacetate, sodium caproamphoacetate and sodium capryloamphoacetate. Further exemplary amphoteric surfactants include disodium cocoamphodiacetate, disodium lauroamphodiacetate, disodium caproamphodiacetate, disodium capryloamphodiacetate, disodium cocoamphodi-propionate, disodium lauroamphodipropionate, disodium caproamphodipropionate, disodium capryloamphodi-propionate, lauroamphodipropionic acid and coco-amphodipropionic acid.

Non-limiting examples that may be mentioned include the cocoamphodiacetate sold by the company Rhodia under the trade name Miranol® C2M Concentrate, the sodium cocoamphoacetate sold under the trade name Miranol Ultra C 32 and the product sold by the company Chimex under the trade name CHIMEXANE HA.

Use may also be made of the compounds of formula (XXI):

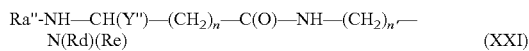

Ra''-NH—CH(Y'')—(CH$_2$)$_n$—C(O)—NH—(CH$_2$)$_{n'}$—N(Rd)(Re)   (XXI)

wherein:
Ra'' represents a C10-C30 alkyl or alkenyl group of an acid Ra''-C(O)OH preferably present in hydrolysed linseed oil or coconut oil;
Y'' represents the group —C(O)OH, —C(O)OZ'', —CH$_2$—CH(OH)—SO$_3$H or the group CH$_2$—CH(OH)—SO$_3$—Z'', with Z'' representing a cationic counterion resulting from an alkali metal or alkaline-earth metal, such as sodium, an ammonium ion or an ion resulting from an organic amine;
Rd and Re represent, independently of each other, a $C_1$-$C_4$ alkyl or hydroxyalkyl radical; and
n and n' denote, independently of each other, an integer ranging from 1 to 3.

Exemplary compounds include sodium diethylaminopropylcoco-aspartamide, such as the one sold by the company Chimex under the name CHIMEXANE HB.

In certain embodiments, the amphoteric surfactants are chosen from ($C_8$-$C_{20}$)alkylbetaines, ($C_8$-$C_{20}$)alkylamido ($C_1$-$C_6$)alkylbetaines, ($C_8$-$C_{20}$)alkylamphoacetates and ($C_8$-$C_{20}$)alkylamphodiacetates, and combinations thereof.

In certain embodiments, the at least one amphoteric surfactant is chosen from ($C_8$-$C_{20}$)alkyl betaines, ($C_8$-$C_{20}$) alkylamido ($C_1$-$C_6$)alkylbetaines, ($C_8$-$C_{20}$)alkylamphoacetate, ($C_8$-$C_{20}$)alkylamphodiacetate, and their salts, and combinations thereof. In some cases, the at least one amphoteric surfactant is selected from coco-betaine, cocamidopropylbetaine, sodium cocoamphoacetate, disodium cocoamphodiacetate, and combinations thereof.

The amphoteric surfactant may be present in an amount in an amount ranging from about 0.05% to about 15%, or from about 0.05% to about 10%, or about 1% to about 2%, by weight, based on the total weight of the foaming cleansing composition. For example, the amphoteric surfactant system may be present in an amount ranging from about 0.05% to about 14%, about 0.05% to about 15%, about 5% to about 13%, about 5% to about 12%, about 5% to about 11%, about 5% to about 10%, about 6% to about 15%, about 6% to about 14%, about 6% to about 13%, about 6% to about 12%, about 6% to about 11%, about 6% to about 10%, about 7% to about 15%, about 7% to about 14%, about 7% to about 13%, about 7% to about 12%, about 7% to about 11%, about 7% to about 10%, about 8% to about 15%, about 8% to about 14%, about 8% to about 13%, about 8% to about 12%, about 8% to about 11%, about 8% to about 10%, about 9% to about 15%, about 9% to about 14%, about 9% to about 13%, about 9% to about 12%, about 9% to about 11%, about 9% to about 10%, about 10% to about 15%, about 10% to about 14%, about 10% to about 13%, about 10% to about 12%, about 10% to about 11%, or about 10% to about 10%, including ranges and sub-ranges there between, by weight, based on the weight of the total composition.

Thus, any one amphoteric surfactant, when present, is present, by weight, based on the total weight of the foaming cleansing composition, from about 0.05, 0.06, 0.07, 0.08, 0.09, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 6, 7, 8, 9, 10, 11, 12, 13, 14, to about 15 weight percent, including increments and ranges therein and there between.

Excluded Surfactants

The foaming cleansing composition excludes alkyl polyglucosides.

In some examples, alkyl polyglucosides excluded from the foaming cleansing composition may include at least one alkyl polyglucoside having the following formula (XIII):

$R^1$—O—($R^2$O)$_n$—Z(x)   (XIII)

wherein:
$R^1$ is an alkyl group having from 8 to 18 carbon atoms;
$R^2$ is an ethylene or propylene group;
Z is a saccharide group with 5 to 6 carbon atoms;
n is an integer from 0 to 10; and
x is an integer from 1 to 5.

Nonlimiting examples of alkyl polyglucosides include decyl glucoside, lauryl glucoside, octyl glucoside, coco glucoside, caprylyl/capryl glucoside, and sodium lauryl glucose carboxylate. In certain embodiments, the at least one alkyl poly glucoside compound include lauryl glucoside, decyl glucoside, coco glucoside, and combinations thereof.

In some embodiments, foaming cleansing composition excludes certain surfactants and emulsifiers, including emulsifiers/surfactants that contain sulfates. Some specific but non-limiting examples of emulsifiers that are lacking from the cleansing composition includes surfactants with a C10-C20 fatty alcohol or acid hydrophobe condensed with from about 2 to about 100 moles of ethylene oxide or propylene oxide per mole of hydrophobe; C2-C10 alkyl phenols condensed with from 2 to 20 moles of alkylene oxide; mono- and di-fatty acid esters of ethylene glycol; fatty acid monoglyceride; sorbitan; mono- and di-C8-C20 fatty acids; polyoxyethylene sorbitan; alkyl polyglycosides and saccharide fatty amides (e.g. methyl gluconamides); alkyl ether sulfate and sulfonates; alkyl sulfates and sulfonates; alkylbenzene sulfonates; alkyl and dialkyl sulfosuccinates; C8-C20 acyl isethionates; C8-C20 alkyl ether phosphates; alkylethercarboxylate. Some specific emulsifiers that are lacking from the cleansing composition include PEG-100 Stearate; PEG-20 Stearate and other esters of Poly(Ethylene Glycol); Sucrose Stearate and other emulsifiers based on sugar esters; Glyceryl Stearate and other glycerol esters; Disodium Ethylene Dicocamide PEG-15 Disulfate; Sodium Steroyl Glutamate and other fatty amides; Steareth-100 and other fatty ethers.

In some embodiments, foaming cleansing composition excludes certain surfactants and emulsifiers, including cationic surfactants, and other cationic compounds.

Emulsifiers

The foaming cleansing composition according to the disclosure may include one or more emulsifiers. In various embodiments, the emulsifiers may be chosen from fatty acids, fatty alcohols, esters of polyols and of a fatty acid, polyol fatty esters and fatty ethers with a branched or unsaturated chain containing from 10 to 30 carbon atoms, esters of sugar and of a fatty acid, and a mixture thereof. Nonlimiting examples of emulsifiers include PEG-30 dipolyhydroxystearate, sodium lauroyl lactylate, ricinoleic acid, glycerol monostearate, glycol distearate, ethyl stearate, cetyl stearate, cetyl palmitate, polyoxyethylene cetyl ether stearate, polyoxyethylene stearyl ether stearate, polyoxyethylene lauryl ether stearate, ethyleneglycol monostearate, polyoxyethylene monostearate, polyoxyethylene distearate, propyleneglycol monostearate, propyleneglycol distearate, trimethylolpropane distearate, sorbitan stearate, polyglyceryl stearate, dimethyl sebacate, PEG-15 cocoate, PPG-15 stearate, glyceryl monostearate, glyceryl distearate, glyceryl tristearate, PEG-8 laurate, PPG-2 isostearate, PPG-9 laurate, PEG-150 distearate, PEG-55 propylene glycol oleate, or combinations thereof.

In some particular embodiments, the foaming cleansing composition includes at least PEG-30 dipolyhydroxystearate present at about 0.05%, and sodium lauroyl lactylate present at about 0.01%, all amounts by weight of the foaming cleansing composition.

In some embodiments the foaming cleansing composition may comprise two or more emulsifiers. The amount of each emulsifier or a combination thereof, when present, may be present in the foaming cleansing composition in a range of from about 0.001% to about 20%, or from about 0.01% to about 15%, or from about 0.1% to about 2%, or any suitable combination, sub-combination, range, or sub-range thereof by weight, based on the weight of the foaming cleansing composition. One of ordinary skill in the art, however, will appreciate that other ranges are within the scope of the invention.

Thus, one or more emulsifier, when present, is present by weight, based on the total weight of the foaming cleansing composition, from about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 6, 7, 8, 9, 10, 11, 12, 13, 14, 15, 16, 17, 18, 19 to about 20 percent, including increments and ranges therein and there between.

Cosmetically Acceptable Solvent

The foaming cleansing composition according to the disclosure comprise water and may include at least one cosmetically acceptable solvent. In certain embodiments, the cosmetically acceptable solvents may be chosen from organic solvents, water-soluble solvents, or combinations thereof. In some embodiments, cosmetically acceptable solvents include glycerin, propylene glycol, propanediol, ethylhexylglycerin and combinations thereof.

The total amount of cosmetically acceptable solvent with water in the foaming cleansing composition may vary, but is typically from about 25% to about 95%, based on the total weight of the foaming cleansing composition. In some cases, the total amount of water is about 30% to about 90%, about 35% to about 85%, about 40% to about 75%, about 45% to about 70%, or about 50% to about 67%, including ranges and sub-ranges there between, by weight based on the total weight of the foaming cleansing composition.

Thus, in accordance with some embodiments, the foaming cleansing composition may include at least one water-soluble solvent. The term "water-soluble solvent" is interchangeable with the term "water-miscible solvent" and means a compound that is liquid at 25° C. and at atmospheric pressure (760 mmHg), and it has a solubility of at least 50% in water under these conditions. In some cases, the water-soluble solvent has a solubility of at least 60%, 70%, 80%, or 90% in water under these conditions. Non-limiting examples of water-soluble solvents include, for example, glycerin, alcohols (for example, C1-C30, C1-C15, C1-C10, or C1-C4 alcohols), organic solvents, polyols, glycols, or mixtures thereof.

As examples of organic solvents, non-limiting mentions can be made of monoalcohols and polyols such as ethyl alcohol, isopropyl alcohol, propyl alcohol, benzyl alcohol, and phenylethyl alcohol, or glycols or glycol ethers such as, for example, monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol. Other suitable examples of organic solvents are ethylene glycol, propylene glycol, butylene glycol, hexylene glycol, propane diol, and glycerin. The organic solvents can be volatile or non-volatile compounds.

Further non-limiting examples of water-soluble solvents include alkanols (polyhydric alcohols such as glycols and polyols) such as glycerin, 1,2,6-hexanetriol, trimethylolpropane, ethylene glycol, propylene glycol, diethylene glycol, butylene glycol, hexylene glycol, triethylene glycol, tetraethylene glycol, pentaethylene glycol, dipropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, 2-butene-1,4-diol, 2-ethyl-1,3-hexanediol, 2-methyl-2,4-pentanediol, (caprylyl glycol), 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, sulfolane, or mixtures thereof.

In some particular embodiments, the foaming cleansing composition contains one or more of glycerin and propylene glycol.

In some particular embodiments, the foaming cleansing composition contains glycerin present at about 10% and propylene glycol present at about 5%.

In accordance with the various embodiments total amount of the at least one water-soluble solvent, when present, may vary, is from about 0.5% to about 25%, or from about 0.5% to about 20%, or from about 1% to about 20%, or from about 1% to about 10%, or from about 2% to about 5%, or from about 5% to about 10%, or any suitable combination, sub-combination, range, or sub-range thereof by weight, based on the weight of the foaming cleansing composition.

One of ordinary skill in the art, however, will appreciate that other ranges are within the scope of the invention.

Thus, any one water-soluble solvent, when present, is present, by weight, based on the total weight of the foaming cleansing composition, from about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24 to about 25 weight percent, including increments and ranges therein and there between.

Preservatives

In accordance with the disclosure, various non-limiting embodiments of the foaming cleansing composition may optionally include one or more preservatives and/or antimicrobials. Any preservative commonly used in cosmetic formulations is an acceptable preservative for the foaming cleansing composition herein, such as phenoxyethanol, salicylic acid, members from the paraben family such as the methyl, ethyl, propyl, butyl or isobutyl parabens, 4-hydroxy benzoic acid, benzoic acid, sorbic acid, dehydroacetic acid, triclosan, benzyl alcohol, chlorphenesin, or for example.

In some embodiments, the preservative may comprise salicylic acid, present from about 0.1% to about 0.5%

In some embodiments, the preservative may comprise one or more of preservatives selected from the group consisting of organic acids, parabens, formaldehyde donors, phenol derivatives, quaternary ammoniums, alcohols, isothiazolinones, and combinations thereof. Preservatives having antibacterial activity are optionally present in the foaming cleansing composition of the present invention. Examples of organic acid preservatives include, but are not limited to, sodium benzoate, potassium sorbate, benzoic acid and dehydroacetic acid, sorbic acid, and combinations thereof. A preferred organic acid preservative system includes a mixture of sodium benzoate and potassium sorbate. Examples of paraben preservatives include, but are not limited to, alkyl para-hydroxybenzoates, wherein the alkyl radical has from 1, 2, 3, 4, 5 or 6 carbon atoms and for example, from 1 to 4 carbon atoms e.g., methyl para-hydroxybenzoate (methylparaben), ethyl para-hydroxybenzoate (ethylparaben), propyl para-hydroxybenzoate (propylparaben), butyl para-hydroxybenzoate (butylparaben) and isobutyl para-hydroxybenzoate (isobutylparaben). Examples of formaldehyde donor preservatives include, but are not limited to, 1,3-Dimethylol-5,5-dimethylhydantoin (DMDM hydantoin), imidazolidinyl urea, gluteraldehyde, and combinations thereof. Examples of quaternary ammonium preservatives include, but are not limited to, benzalkonium chloride, methene ammonium chloride, benzethonium chloride, and combinations thereof. Examples of alcohol preservatives include, but are not limited to, ethanol, benzyl alcohol, dichlorobenzyl alcohol, phenoxyethanol, and combinations thereof. Examples of isothiazolone preservatives include, but are not limited to, methylchloroisothiazolinone, methylisothiazolinone, and combinations thereof.

Other suitable preservatives include, but are not limited to, chloroacetamide, triclosan and iodopropynyl butylcarbamate, pyridine derivatives (e.g., pyrithione and zinc pyrithione), chlorphenesin, phenyl mercuric salts, phenoxyethanol, and other known preservative systems.

In some embodiments, the preservative includes one or more preservatives, the one or combination present at a concentration, by weight of about 0.001% to about 5%, or alternatively about 0.05% to about 2.5% or alternatively about 0.1% to about 2.0%, based upon weight of the foaming cleansing composition.

Thus, any one of or a combination of preservatives, when present, may be present, by weight, based on the total weight of the foaming cleansing composition, is from about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 1.0, 1.1, 1.2, 1.3, 1.4, 1.5, 1.6, 1.7, 1.8, 1.9, 2, 3, 4, to about 5 weight percent, including increments and ranges therein and there between.

Additional Components

In various embodiments, it may be advantageous to include additional components in the foaming cleansing composition according to the disclosure. In various embodiments the foaming cleansing composition may include at least one additive used in the cosmetics field which does not affect the properties of the foaming cleansing composition according to the invention, such as, fragrances, pH adjusters; citric acid, sodium chloride, sodium citrate; chelators, neutralizing or pH-adjusting agents (e.g., EDTA, triethylamine (TEA), potassium and sodium hydroxide), and combinations thereof); sodium chloride, magnesium dichloride or magnesium sulfate; other cosmetically acceptable additives, such as but not limited to, pearlescent agents, silica, and coloring materials; oils and fatty compounds; essential oils; fruit extracts, for example, *Pyrus Malus* (Apple) Fruit Extract, and Aloe Barbadensis Leaf Juice Powder. In some examples, the foaming cleansing composition according to the disclosure may comprise additives chosen from nacreous agents, dyes or pigments, fragrances, mineral, plant or synthetic oils, waxes, vitamins (e.g., panthenol, Vitamin E, biotin, etc.), proteins including ceramides, vitamins, UV-screening agents, free-radical scavengers, antidandruff agents, hair-loss counteractants, hair restorers, preserving agents, and combinations thereof.

By way of example only, the foaming cleansing composition may comprise any one or more of ceramide EOP, ceramide NP, ceramide AP, caprylyl glycol, potassium hydroxide, sodium hydroxide, propanediol, phytosphingosine, glycerin, propylene glycol, cholesterol, sodium citrate, tetrasodium EDTA, benzoic acid, sodium citrate triethyl citrate, glycolic acid, or a mixture thereof.

Although the optional additives are given as examples, it will be appreciated that other optional components compatible with cosmetic applications known in the art may be used.

A person skilled in the art will take care to select the optional additives and the amount thereof such that they do not harm the properties of the foaming cleansing composition of the present disclosure.

In various embodiments, the additives are generally present in an amount ranging up to about 40% by weight of active material based on the total weight of the foaming cleansing composition, such as up to about 30%, up to about 20%, up to about 15%, up to about 10%, up to about 5%, such as from about 0.01% to about 20%.

In accordance with the various embodiments, the amount of one or more additives, alone or in combination, present in the foaming cleansing composition can be present in the foaming cleansing composition according to the disclosure in a range from about 0.001% to about 20%, by weight, or from about 0.005% to about 0.01%, or from about 0.01% to about 0.1%, or from about 0.15% to about 5%, or from about 0.40% to about 4%, or from about 0.5% to about 2.5% by weight, or from about 1% to about 2%, or any suitable combination, sub-combination, range, or sub-range thereof by weight, based on the total weight of the foaming cleansing composition. One of ordinary skill in the art, however, will appreciate that other ranges are within the scope of the invention.

Thus, any one or a combination of additives may be present, by weight, based on the total weight of the foaming cleansing composition, each one or the combination present from about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.10, 0.20, 0.30, 0.40, 0.50, 0.60, 0.70, 0.80, 0.90, 1.0, 2, 3, 4, 5, 6, 7, 8, 9, 10, 11, 12, 13, 14, 15, 16, 17, 18, 19 to about 20 weight percent, including increments and ranges therein and there between.

In some embodiments, the foaming cleansing composition are free or essentially free of oils and silicones. For example, the foaming cleansing composition may in some embodiments include less than about 3%, less than about 2%, less than about 1%, or less than about 0.5% of one or more of oils, silicones or combinations thereof. In other embodiments, the foaming cleansing composition comprise one or more of oils, silicones or combinations thereof, for example in an amount of from about 0.1% up to about 1%, such as up to about 2%, up to about 3%, up to about 4%, or up to about 5%. Non-limiting examples of silicones include amine-functionalized silicones (e.g., amodimethicone), dimethicone, bis-aminopropyl dimethicone, trimethyl silylamodimethicone, etc.

In some embodiments, the foaming cleansing composition is free or essentially free of one or more of oils, silicones or combinations thereof.

Methods Preparing and of Use

The inventive foaming cleansing composition is prepared by mixing the ingredients. After batch formation, viscosity is evaluated over time in accordance with industry standard stability protocols to determine shelf stability based on stability of viscosity. Viscosity was evaluated at the following timepoints: initially, 4 weeks, 8 weeks and 12 weeks at 4° C., 25° C., and 37° C. and the resultant viscosity of the inventive composition is characterized as follows: Viscosity rheomat at 25° C. in a range from about 15 to about 30, or from about 18 to about 25, wherein the foaming cleansing composition is deemed stable if the viscosity change is not more than 5%, or 10%, or 20%. Stability tests also demonstrated stability of the exemplified inventive foaming cleansing composition at elevated temperatures of 37° C., 40° C., and 45° C.

According to various embodiments, the foaming cleansing composition may be useful in methods of treating and/or caring for the skin, hair, and/or scalp. By way of example, when the foaming cleansing composition are used for skin care applications, or for shampoo applications, the foaming cleansing composition may be useful in methods of cleansing and/or conditioning the face, body, hair and/or scalp.

The foaming cleansing composition according to the disclosure may be applied to the skin, hair, and/or scalp and subsequently rinsed off. For example, the skin, hair, and/or scalp may be washed or cleansed in a first step of applying the foaming cleansing composition of the disclosure onto the skin, hair, and/or scalp, followed by an optional second repeat step of washing, each step including a leave-on time, for example up to 10 minutes, up to 5 minutes, up to 2 minutes, up to 1 minute, up to 30 seconds, up to 20 seconds, up to 10 seconds, up to 5 seconds, etc., and concluding by rinsing with water. In some exemplary embodiments, the leave-on time for the foaming cleansing composition is from about 1 to about 5 minutes and in some embodiments at least 5 minutes.

The methods of treating and/or caring for the skin, hair, and/or scalp according to the disclosure may, in various embodiments, impart the anti-acne benefits of the benzoyl peroxide, and skin conditioning benefits to the skin or scalp, even after the foaming cleansing composition is rinsed off. In particular, the foaming cleansing composition has a desirable textural feel and remains on the skin even in warm, humid or wet conditions to allow maximum benefit of the actives as compared with prior art compositions that are thin and tend to run off the skin.

The foaming cleansing composition according to the disclosure may be contained in a tube, a bottle optionally equipped with a pump, a jar, or any suitable package.

It should be understood that various features and/or characteristics of differing embodiments herein may be combined with one another. It is therefore to be understood that numerous modifications may be made to the illustrative embodiments and that other arrangements may be devised without departing from the scope of the disclosure. Other embodiments will be apparent to those skilled in the art from consideration of the disclosure and practice of the various exemplary embodiments disclosed herein.

EXAMPLES

The following examples serve to illustrate the embodiments of the disclosure without however exhibiting a limiting character. The Examples are intended to be non-restrictive and explanatory only, with the scope of the invention being defined by the claims. In these examples the amounts of the foaming cleansing composition ingredients are given as weight percentages of active ingredients based on the total weight of the foaming cleansing composition.

Example 1—Raw Materials

An embodiment of the inventive foaming cleansing composition is provided in Table 1.
TABLE 1: Raw Materials
The examples below according to the invention are given by way of illustration and without a limiting nature. The names are the chemical name or the INCI name. Compositions and systems as described in the representative embodiments herein are selected from commercially available materials, including, as shown in the exemplified embodiments herein below.

TABLE 1

Raw Materials
Table 2: Raw Materials

| RM INGREDIENT | PERCENT ACTIVE (IF <100%) |
|---|---|
| POTASSIUM HYDROXIDE | |
| NIACINAMIDE | |
| SODIUM HYALURONATE | |
| GLYCERIN | |
| COCAMIDOPROPYL HYDROXYSULTAINE | 50% active |
| PROPYLENE GLYCOL | |
| GLYCOLIC ACID | |
| ACRYLATES/C10-30 ALKYL ACRYLATE CROSSPOLYMER CARBOPOL ULTREZ 20 POLYMER (LUBRIZOL) | 90% active |
| SODIUM C14-16 OLEFIN SULFONATE | 40% active |
| BENZOYL PEROXIDE CUROXYL 42 from Vantage Specialty Chemicals | 43% active |

The inventive foaming cleansing composition as exemplified herein includes the foregoing raw materials wherein the active constituents of the raw materials are listed as discrete ingredients; the amounts of active ingredients are given for the exemplified compositions as % by weight of the active ingredients based on the weight of the entire composition, not as amounts of raw materials except as may be expressly stated.

Example 2—Inventive Composition

An embodiment of the inventive foaming cleansing composition is provided in Table 2.

TABLE 2

| Inventive Composition | |
| --- | --- |
| INCI US | INV 1 |
| COCAMIDOPROPYL HYDROXYSULTAINE | 2.0 |
| SODIUM C14-16 OLEFIN SULFONATE | 1.56 |
| ACRYLATES/C10-30 ALKYL ACRYLATE CROSSPOLYMER | 0.9 |
| SODIUM HYALURONATE | 0.1 |
| NIACINAMIDE | 0.1 |
| BENZOYL PEROXIDE | 10 |
| CERAMIDES (EOP, NP, AP) | ~0.002 |
| SOLVENT (GLYCERIN, PROPYLENE GLYCOL) | ~15 |
| OTHER INGREDIENTS (pH adjusters, salt, etc; CAPRYLYL GLYCOL, NAOH, KOH, SODIUM CITRATE, EDTA, BENZOIC ACID, CHOLESTEROL, TRIETHYL CITRATE, GLYCOLIC ACID, PHYTOSPHINGOSINE, DIETHYLHEXYL SODIUM SULFOSUCCINATE, SODIUM LAUROYL LACTYLATE, TRIDECETH-6, PEG-30 DIPOLYHYDROXYSTEARATE, PROPANEDIOL, CARBOMER, XANTHAN GUM) | ~1.24 |
| WATER | 68.98359900 |

In some embodiments, inventive foaming cleansing composition may include the following ingredients in amounts by total weight of the foaming cleansing composition that include: diethylhexyl sodium sulfosuccinate (~0.12), PEG-30 dipolyhydroxystearate (~0.05), cocamidopropyl hydroxysultaine (~2.0), sodium C14-16 olefin sulfonate (~1.6), sodium lauroyl lactylate (~0.01), trideceth-6 (~0.05), acrylates/C10-30 alkyl acrylate crosspolymer (~1.0), sodium hyaluronate (~0.1), niacinamide (~0.1), benzoyl peroxide (~10-12), ceramide EOP, ceramide NP, ceramide AP, xanthan gum (~0.0003), caprylyl glycol (~0.0006), potassium hydroxide (~0.5), sodium hydroxide (~0.02), propanediol (~0.2), phytosphingosine (~0.0006), glycerin (~10), propylene glycol (~5), cholesterol (~0.0005), sodium citrate (~0.2), tetrasodium EDTA (~0.004), benzoic acid (~0.012), sodium citrate (~0.02), triethyl citrate (~0.0007), glycolic acid (~0.007), carbomer (~0.09), water (~70), all present by weight based on the weight of the foaming cleansing composition. In the exemplified embodiment, the inventive foaming cleansing composition may include ceramides present and provided in a raw material comprising SODIUM LAUROYL LACTYLATE (and) CERAMIDE NP (and) CERAMIDE AP (and) PHYTOSPHINGOSINE (and) CHOLESTEROL (and) XANTHAN GUM (and) CARBOMER (and) CERAMIDE EOP supplied by Evonik Goldschmidt of which raw material the composition includes 0.1% by weight.

Example 3—Demonstration of Stability: Appearance, pH and Viscosity

As shown in Table 3, in various embodiments, the foaming cleansing composition according to the disclosure displays stability as evidenced by measurement of viscosity and observation by the unaided eye, and microscopically over a period of at least twelve (12) weeks and after freeze thaw cycles in a temperature range from −20° C. through 20° C., and at ambient temperatures of 4° C., 25° C., 37° C. The composition is generally visually and microscopically unchanged and presents as an opaque, bright white gel with mousse texture, wherein BPO and bubbles of a generally homogeneous size are homogeneously dispersed in the gel-mousse.

TABLE 3

| Stability Demonstration with INVENTIVE COMPOSITION | | | | |
| --- | --- | --- | --- | --- |
| PROPERTY | INITIAL | 4 WEEKS | 8 WEEKS | 12 WEEKS |
| pH @ 25° C. | 6.29 | 6.19 | 6.18 | 5.98 |
| viscosity at T0 @ 25° C. | 18.4 | 18.6 | 19.8 | 18.3 |
| viscosity at T10 @ 25° C. | 20.7 | 20 | 20.5 | 20.3 |
| appearance (visible, color, odor) @ 25° C. | Opaque gel; mousse texture Bright white | unchanged | unchanged | unchanged |
| appearance (micro, nonpolarized) @ 25° C. | BPO dispersed; generally homogenous sized and dispersed bubbles | unchanged | unchanged | unchanged |
| appearance (micro, polarized) @ 25° C. | BPO dispersed; generally homogenous sized and dispersed bubbles | unchanged | unchanged | unchanged |
| pH @ 37° C. | NA | 5.98 | 5.8 | 5.72 |
| viscosity at T0 @ 37° C. | NA | 18.7 | 24.6 | 23.8 |
| viscosity at T10 @ 37° C. | NA | 20.1 | 22.8 | 19.8 |
| appearance (visible, color, odor) @ 37° C. | NA | Opaque gel; mousse texture Bright white | unchanged | unchanged |
| appearance (micro, nonpolarized) @ 37° C. | NA | BPO dispersed; generally homogenous sized and dispersed bubbles | unchanged | unchanged |
| appearance (micro, polarized) @ 37° C. | NA | BPO dispersed; generally homogenous sized and dispersed bubbles | unchanged | unchanged |
| appearance (visible, color, odor) @ 4° C. | NA | Opaque gel; mousse texture Bright white; Texture and aesthetic maintained | same | same |

* Viscosity Rheomat Spindle; T = XX

Example 4—Comparative Compositions

TABLE 4

| COMPARATIVE COMPOSITIONS | |
| --- | --- |
| COMP 1 Commercial 4% BPO Cleanser | COMP 2 Commercial 10% BPO Cleanser |
| Benzoyl Peroxide 4% Benzoic Acid | Benzoyl Peroxide 10% Carbomer Homopolymer Type C |

TABLE 4-continued

COMPARATIVE COMPOSITIONS

| COMP 1 Commercial<br>4% BPO Cleanser | COMP 2 Commercial<br>10% BPO Cleanser |
|---|---|
| Carbomer | Carbomer Interpolymer Type A |
| Ceramide AP | Decyl Glucoside |
| Ceramide EOP | Dimethiocone |
| Ceramide NP | Dioctyl Sodium Sulfosuccinate |
| Cholesterol | Glycerin |
| Citric Acid | Palmitic Acid |
| Cocamidopropyl Hydroxysultaine | Polyacrylate Crosspolymer-6 |
| Diethylhexyl Sodium Sulfosuccinate | Polyoxyl 40 Stearate |
| Ethylhexylglycerin | Propanediol |
| Glycerin | Purified Water |
| Glycolic Acid | Silica |
| Niacinamide | Sodium Chloride |
| Phenoxyethanol | Sodium Citrate |
| Phytosphingosine | Sodium Hydroxide |
| Potassium Hydroxide | Sodium Laurylglucosides Hydroxypropylsulfonate |
| Propanediol | Sorbitan Stearate |
| Propylene Glycol | Stearic Acid |
| Sodium C14-16 Olefin Sulfonate | T-Butyl Alcohol |
| Sodium Chloride | Xanthan Gum |
| Sodium Citrate | |
| Sodium Hyaluronate | |
| Sodium Hydroxide | |
| Sodium Lauroyl Lactylate | |
| Tetrasodium EDTA | |
| Water | |
| Xanthan Gum | |

Example 5—Comparison of Inventives and Comparatives

Table 5 provides a comparison between inventive and comparative compositions.

TABLE 5

Comparison of Inventives and Comparatives

| Formulation | INV1; 10% BPO Cleanser | COMP 1 Commercial 4% BPO (with xanthan gum) | COMP 2 10% BPO Cleanser (with carbomer and alkyl polyglucoside surfactant) |
|---|---|---|---|
| Active Ingredient Surfactant System | Benzoyl Peroxide 10% Sodium C14-C16 Olefin Sulfonate; Cocamidopropyl Hydroxysultaine | Benzoyl Peroxide 4% Sodium C14-C16 Olefin Sulfonate; Cocamidopropyl Hydroxysultaine | Benzoyl Peroxide 10% alkyl polyglucoside (Dioctyl Sodium Sulfosuccinate; Sodium Laurylglucosides-Hydroxy-propylsulfonate) |
| Thickening System | Acrylate Copolymer | Xanthan Gum | Carbomer |
| Other Ingredients | Niacinamide, Sodium Hyaluronate | Niacinamide, Sodium Hyaluronate | |
| Product Architecture | Mousse | Thin, Lotion | Thin, lotion |
| Preservative System | N/A | N/A | N/A |

Example 6—Comparison of Inventives and Test Compositions Based on Inventive

Table 6 provides a comparison between inventive and test compositions in which one or more components from INV1 have been substituted or removed. Reference is made to the testing method for establishing bubble properties via the KRUSS Dynamic Foam Analyzer 100 Foam Structure Model (DFA100FSM) which measures the foamability of liquids using intelligent video image analysis. The DFA10OFSM analyzes the foam structure regarding bubble size and distribution. Utilizing a sparging mechanism the product foaming quality is characterized by average bubble radius, mean bubble size, and bubble count per $mm^2$.

TABLE 6

Bubble properties of compositions

| Composition | Final Average Bubble Radius (μm) | Final Mean Bubble Area (μm$^2$) | Final Bubble Count per mm$^2$ (mm$^{-2}$) | Comment |
|---|---|---|---|---|
| INV 1<br>a. 2.5% to 10.0% Benzoyl Peroxide<br>b. an acrylate polymer<br>c. Hyaluronic Acid<br>d. Niacinamide<br>e. a combination of anionic and amphoteric surfactants | 77 | 22652 | 44.146 | Mousse texture; dispersed uniform bubble structure; quick merge with water and not slippery; moderate speed of foaming with modest bubble size (mild foam quality) |
| TEST 1; INV 1 with replaced surfactants to include ALKYL POLYGLUCOSIDE SURFACTANT DECYL GLUCOSIDE | 97 | 41417 | 24.145 | Lacks mousse texture; foam/bubbles similar to INV 1, dispersed uniform bubble structure; increased slip; creams rather than foams, squeaky application and after feel |
| TEST 2; INV 1 without Hyaluronic Acid Niacinamide | 1026 | 5457833 | 0.183 | Mousse texture; large aggregates of varied sized bubbles; (extremely different foaming structure and foaming and cleansing experience) |

TABLE 6-continued

Bubble properties of compositions

| Composition | Final Average Bubble Radius (μm) | Final Mean Bubble Area (μm²) | Final Bubble Count per mm² (mm⁻²) | Comment |
|---|---|---|---|---|
| TEST 2; INV 1 without Niacinamide | 948 | 6791196 | 0.147 | Mousse texture; large aggregates of varied sized bubbles; (extremely different foaming structure and foaming and cleansing experience) |

As shown in Table 6, the instant inventive composition provides a mousse texture with desirable aesthetics on application which properties are dependent on the exclusion of ALKYL POLYGLUCOSIDE surfactants and on inclusion of both hyaluronic acid and niacinamide.

Example 7—Comparison of Inventives and Comparatives

In a sequential, monadic blinded home use study, an inventive and comparative compositions were tested for quality of experience. Each of the inventive (INV 1) and comparative (COMP 2) compositions included 10% benzoyl peroxide. Thirty six test subjects ages 18-65 used each cleanser wherein the subjects are current users of face and body cleansers having 2%, 4% or 8% benzoyl peroxide. Each subject has mild to moderate facial and body acne, each are daily users of moisturizer and SPF and willing to try a 10% benzoyl peroxide product.

Table 7 provides a comparison between inventive INV 1 composition and comparative composition COMP 2 demonstrating the consumer experience with each composition.

| PROPERTY | OBSERVATION | INV 1 | COMP 2 |
|---|---|---|---|
| Product Look | Both are neutral in color with a thick consistency. | 1 | 1 |
| Product Feel | INV1 is creamy and smooth, while COMP2 develops into a gritty, runnier and thinner substance. | 2 | 1 |
| Scent & Texture | Both have strong smell of benzoyl peroxide, but COMP2 is overwhelming. | 1 | 0 |
| Application Feel | INV1 provides smooth and soft application; COMP2, is gritty, oily and irritating. Foaming is comparable for both. | 2 | 1 |
| End Look | Both provide acne-clearing results for most users. Additional breakouts and visible irritation are more common with COMP2 than with INV1. | 1 | 1 |
| End Feel | INV1 yields skin ultimately that is smoother and softer in texture than experienced with COMP2 which also causes dryness. | 2 | 1 |
| Readiness for use of other skin care products | Both products deliver deeply cleansed skin, well-prepared for ideal results from other skincare products. | 2 | 2 |
| TOTALS | | 10 (generally exceeds expectations) | 7 (generally meets expectations) |

Scoring: 2 = exceeds expectations; 1 = meets expectations; 0 = needs improvement While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All patents and publications are expressly incorporated herein in their entireties.

As used herein, the terms "comprising," "having," and "including" are used in their open, non-limiting sense.

The terms "a," "an," and "the" are understood to encompass the plural as well as the singular. Thus, the term "a surfactant" includes both a single surfactant and a plurality of surfactants.

The expression "one or more" means "at least one" and thus includes individual components as well as mixtures/combinations.

Other than in the operating examples, or where otherwise indicated, all numbers expressing quantities of ingredients and/or reaction conditions are to be understood as being modified in all instances by the term "about," meaning within +/−5%, 4%, 3%, 2%, or 1% of the indicated number.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, parts and ratios herein are relative to the amount of active agent, based upon the total weight of the foaming cleansing composition of the present disclosure, unless otherwise indicated.

As used herein, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

As used herein, the terms "free" and "essentially free" and "exclude/excludes" are intended to denote that the component is absent entirely from the foaming cleansing composition, or is present in an amount considered by those skilled in the art to not provide an effect on the foaming cleansing composition. For example, the component may be present in an amount below the level of detection, or may be present in an amount less than 3%, less than 2%, less than 1%, less than 0.5%, less than 0.1%, less than 0.01%, or less than 0.001%.

It should also be understood that the precise numerical values used in the specification and claims form additional embodiments of the disclosure, and are intended to include any ranges which may be narrowed to any two end points disclosed within the exemplary ranges and values provided, as well as the specific end points themselves. Efforts have been made to ensure the accuracy of the numerical values disclosed herein. Any measured numerical value, however, can inherently contain certain errors resulting from the standard deviation found in its respective measuring technique.

The foaming cleansing composition and methods of the present disclosure can comprise, consist of, or consist essentially of the essential elements and limitations of the disclosure described herein, as well as any additional or optional ingredients, components, or limitations described herein or otherwise useful.

Unless otherwise expressly stated, it is in no way intended that any method set forth herein be construed as requiring that its steps be performed in a specific order. Accordingly, where a method claim does not expressly recite that a particular order of steps must be followed or it is not otherwise specifically stated in the claims or descriptions that the steps are to be limited to a specific order, it is no way intended that any particular order be inferred.

The invention claimed is:

1. A foaming cleansing composition, comprising:
    a. about 9% to about 12% benzoyl peroxide, by weight based on the total weight of the foaming cleansing composition;
    b. about 0.1% to about 5.0% at least one acrylate polymer, by weight based on the total weight of the foaming cleansing composition;
    c. about 0.1% to about 2.0% hyaluronic acid, by weight based on the total weight of the foaming cleansing composition;
    d. about 0.1% to about 2.0% niacinamide, by weight based on the total weight of the foaming cleansing composition;
    e. about 4% to about 15% a combination of anionic and amphoteric surfactants, expressly excluding alkyl polyglucosides, by weight based on the total weight of the foaming cleansing composition; and
    f. water,
    wherein the composition has a stable mousse form including a pH from about 5.5 to about 6.5 and a viscosity of about 85,000-100,000 cP for at least six weeks at a temperature of 25° C.

2. The foaming cleansing composition according to claim 1, wherein benzoyl peroxide is present at about 10%, by weight based on the total weight of the foaming cleansing composition.

3. The foaming cleansing composition according to claim 1, wherein each surfactant in the combination of anionic and amphoteric surfactants is present in the foaming cleansing composition from about 0.05% to about 15%, by weight based on the total weight of the foaming cleansing composition.

4. The foaming cleansing composition according to claim 1, wherein the at least one acrylate polymer comprises acrylates/C10-30 alkyl acrylate crosspolymer.

5. The foaming cleansing composition according to claim 1, wherein the combination of anionic and amphoteric surfactants is selected from the group consisting of sultaines, sulfonates, betaines, amphoacetates, amphopropionates, and combinations thereof.

6. The foaming cleansing composition according to claim 1, wherein the combination of anionic and amphoteric surfactants comprises cocamidopropyl hydroxysultaine, and sodium C14-16 olefin sulfonate.

7. The foaming cleansing composition according to claim 1, wherein the composition comprises at least one additional compound selected from the group consisting of pH adjusters, chelating agents, alcohols, antimicrobials, preservatives, vitamins, fragrances, humectants, emulsifiers, and combinations thereof.

8. The foaming cleansing composition according to claim 1, wherein the foaming cleansing composition is free or essentially free of sulfates, oils, silicones, cationic compounds, and combinations thereof.

9. A method for cleansing and enhancing acne-prone skin, comprising: providing a foaming cleansing composition according to claim 1, wherein the composition is contained and dispensed as a mousse; initially rubbing the composition onto skin whereupon foaming is accomplished while being retained on skin; rinsing to remove the composition.

10. A foaming cleansing composition, comprising:
    a. about 10.0% benzoyl peroxide;
    b. at least one acrylate polymer, the acrylate polymer comprising acrylates/C10-30 alkyl acrylate crosspolymer present from about 0.1% to about 5.0%;
    c. from about 0.1% to about 2.0% hyaluronic acid;
    d. from about 0.1% to about 2.0% niacinamide;
    e. from about 4.0% to about 15.0% a combination of anionic and amphoteric surfactants including cocamidopropyl hydroxysultaine and sodium C14-16 olefin sulfonate and expressly excluding alkyl polyglucosides;
    f. water; and
    g. at least one additional compound selected from the group consisting of pH adjusters, chelating agents, alcohols, antimicrobials, preservatives, vitamins, fragrances, humectants, emulsifiers, and combinations thereof,
    all amounts by weight, based on the weight of the composition, wherein the composition has a mousse form, a pH from about 5.5 to about 6.5, and a viscosity of about 85,000-100,000 cP.

11. The foaming cleansing composition according to claim 10, wherein the foaming cleansing composition is free or essentially free of sulfates, oils, silicones, cationic compounds, and combinations thereof.

12. The foaming cleansing composition of claim 10, wherein the mousse form is a stable mousse form including the pH from about 5.5 to about 6.5 and the viscosity of about 85,000-100,000 cP for at least six weeks at a temperature of 25° C.

\* \* \* \* \*